US012671025B2

(12) United States Patent
Yang et al.

(10) Patent No.: US 12,671,025 B2
(45) Date of Patent: Jun. 30, 2026

(54) COIL COMPONENT

(71) Applicant: SAMSUNG ELECTRO-MECHANICS CO., LTD., Suwon-si (KR)

(72) Inventors: Ju Hwan Yang, Suwon-si (KR); Yoon Mi Cha, Suwon-si (KR); Mi Geum Kim, Suwon-si (KR); Tai Yon Cho, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1038 days.

(21) Appl. No.: 17/730,409

(22) Filed: Apr. 27, 2022

(65) Prior Publication Data

US 2022/0399161 A1 Dec. 15, 2022

(30) Foreign Application Priority Data

Jun. 15, 2021 (KR) ........................ 10-2021-0077357

(51) Int. Cl.
*H01F 27/32* (2006.01)
*H01F 27/28* (2006.01)
*H01F 27/29* (2006.01)

(52) U.S. Cl.
CPC ....... *H01F 27/327* (2013.01); *H01F 27/2804* (2013.01); *H01F 27/292* (2013.01)

(58) Field of Classification Search
CPC ... H01F 27/327; H01F 27/2804; H01F 27/292
See application file for complete search history.

(56) References Cited

U.S. PATENT DOCUMENTS 8,201,318 B2 † 6/2012 Yamano
9,340,922 B2 * 5/2016 Im ........................ D06M 10/10
11,053,352 B2 * 7/2021 Chen ........................ C08K 5/14
2008/0286585 A1 * 11/2008 Lem ........................ H05K 3/381 428/458

(Continued)

FOREIGN PATENT DOCUMENTS

JP 2006339525 A * 12/2006
KR 10-2016-0072455 A 6/2016

(Continued)

OTHER PUBLICATIONS

Office Action issued on Aug. 21, 2025 in the corresponding Korean Patent Application No. 10-2021-0077357 with English translation.

(Continued)

*Primary Examiner* — Malcolm Barnes
(74) *Attorney, Agent, or Firm* — Morgan, Lewis & Bockius LLP

(57) ABSTRACT

A coil component including: a body; a coil portion including first and second lead-out terminals and disposed in the body; an insulating film disposed between the coil portion and the body and containing a thermosetting resin having a vinyl group; and an external electrode portion disposed on the body and connected to each of the first and second lead-out terminals of the coil portion.

19 Claims, 11 Drawing Sheets

(56) References Cited

U.S. PATENT DOCUMENTS

| | | | | |
|---|---|---|---|---|
| 2015/0102891 | A1* | 4/2015 | Yoon | H01F 27/2804 336/200 |
| 2016/0172096 | A1* | 6/2016 | Jeong | H01F 17/04 336/200 |
| 2018/0366246 | A1* | 12/2018 | Park | H01F 17/04 |
| 2020/0027649 | A1* | 1/2020 | Yang | H01F 27/361 |
| 2020/0066439 | A1 | 2/2020 | Koo et al. | |
| 2020/0082975 | A1* | 3/2020 | Yang | H01F 17/0013 |
| 2020/0090853 | A1* | 3/2020 | Yang | H01F 17/04 |
| 2020/0194167 | A1 | 6/2020 | Lee et al. | |
| 2021/0035728 | A1 | 2/2021 | Li et al. | |
| 2021/0090781 | A1* | 3/2021 | Tominaga | H01F 27/2804 |
| 2021/0090784 | A1* | 3/2021 | Kim | H01F 17/0013 |
| 2021/0125776 | A1* | 4/2021 | Yoshioka | H01F 27/292 |
| 2021/0134516 | A1* | 5/2021 | Yoshioka | H01F 27/2804 |

FOREIGN PATENT DOCUMENTS

| | | | |
|---|---|---|---|
| KR | 10-2069635 | B1 | 2/2020 |
| KR | 10-2020-0022125 | A | 3/2020 |
| KR | 10-2020-0074479 | A | 6/2020 |
| KR | 10-2191248 | B1 | 12/2020 |
| KR | 10-2021-0013849 | A | 2/2021 |

OTHER PUBLICATIONS

Office Action issued on Mar. 31, 2026 in corresponding Korean Patent Application No. 10-2021-0077357 with English translation.

Office Action dated Apr. 17, 2026 issued in corresponding Chinese Patent Application No. 202210679265.3 with English abstract.

* cited by examiner
† cited by third party

COIL COMPONENT

CROSS-REFERENCE TO RELATED APPLICATION(S)

This application claims benefit of priority to Korean Patent Application No. 10-2021-0077357 filed on Jun. 15, 2021 in the Korean Intellectual Property Office, the disclosure of which is incorporated herein by reference in its entirety.

TECHNICAL FIELD

The present disclosure relates to a coil component.

BACKGROUND

An inductor, one of coil components, is a representative passive electronic component used in an electronic device, together with a resistor and a capacitor.

In a case of a thin-film type coil component in which a coil is formed by plating on an insulating substrate, generally, coils, coil insulating films, and bodies of a plurality of individual components are collectively formed on a large-area substrate (also known as a coil bar), and then dicing is performed to separate the bodies of the plurality of individual components connected to each other. Thereafter, an external electrode and a surface insulating layer are formed on the body of the individual component.

Meanwhile, in the above-described dicing, the coil insulating film formed on a surface of the coil is also diced. The coil insulating film may be elongated and attached to a surface of the body of the individual component during the dicing, resulting in a defect in appearance and a defect in a subsequent process of forming the external electrode.

SUMMARY

An aspect of the present disclosure may provide a coil component capable of reducing a defect in appearance.

Another aspect of the present disclosure may provide a coil component capable of improving reliability in coupling between an external electrode and a coil portion.

According to an aspect of the present disclosure, a coil component may include: a body; a coil portion including first and second lead-out terminals and disposed in the body; an insulating film disposed between the coil portion and the body and containing a thermosetting resin having a vinyl group; and an external electrode portion disposed on the body and connected to each of the first and second lead-out terminals of the coil portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
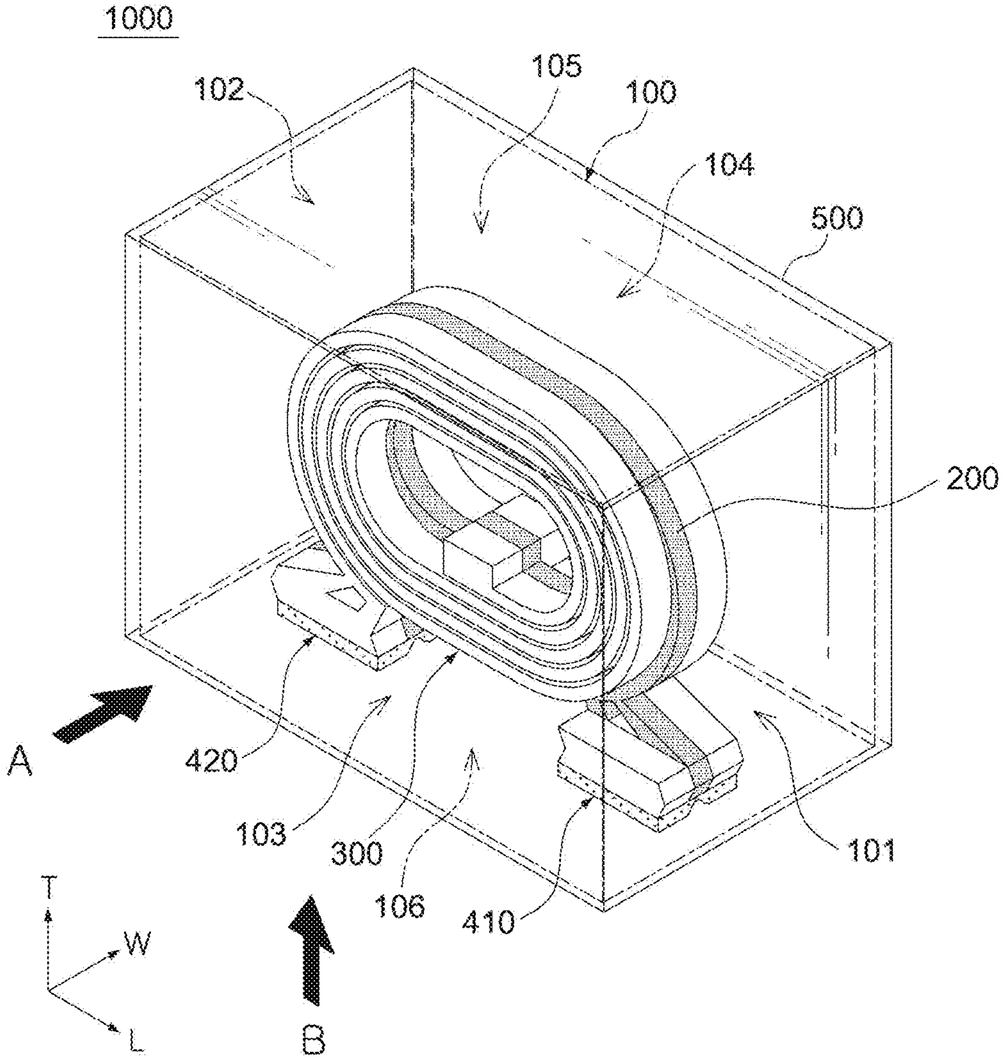
FIG. 1 is a perspective view schematically illustrating a coil component according to an exemplary embodiment in the present disclosure.

Hereinafter, exemplary embodiments in the present disclosure will now be described in detail with reference to the accompanying drawings.

In the drawings, an L direction refers to a first direction or a length direction, a W direction refers to a second direction or a width direction, and a T direction refers to a third direction or a thickness direction.

Various kinds of electronic components may be used in an electronic device, and various kinds of coil components may be appropriately used between these electronic components for purposes such as noise removal.

That is, the coil components used in the electronic device may be a power inductor, a high frequency (HF) inductor, a general bead, a high frequency bead (GHz bead), a common mode filter, and the like.

Figure 2:
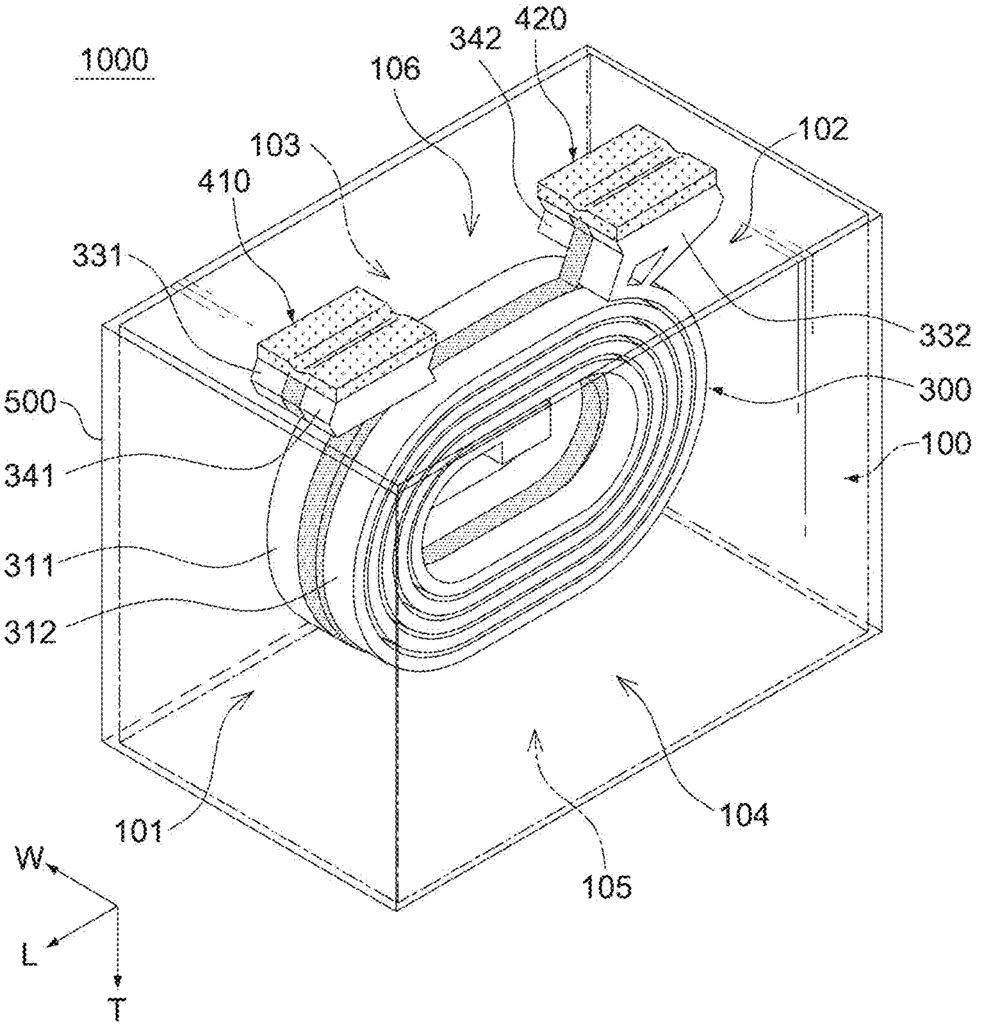
FIG. 2 is a view schematically illustrating the coil component according to an exemplary embodiment in the present disclosure as viewed from below.
Figure 3:
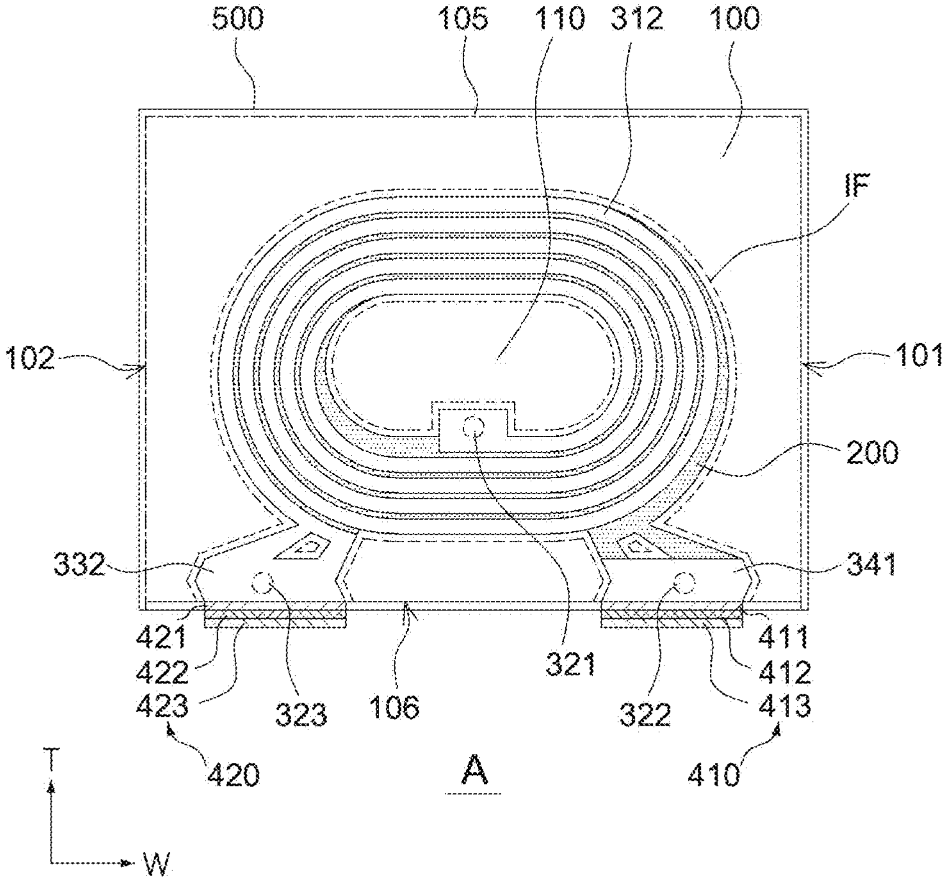
FIG. 3 is a view schematically illustrating the coil component according to an exemplary embodiment in the present disclosure as viewed in a direction A of FIG. 1.
Figure 4:
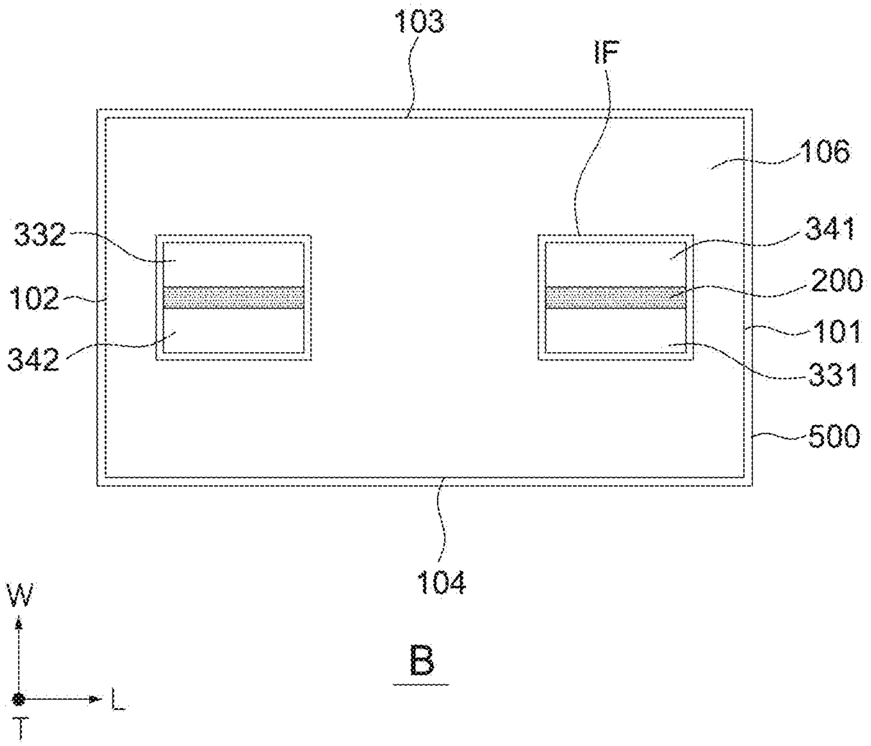
FIG. 4 is a view schematically illustrating the coil component according to an exemplary embodiment in the present disclosure as viewed in a direction B of FIG. 1.
Figure 5:
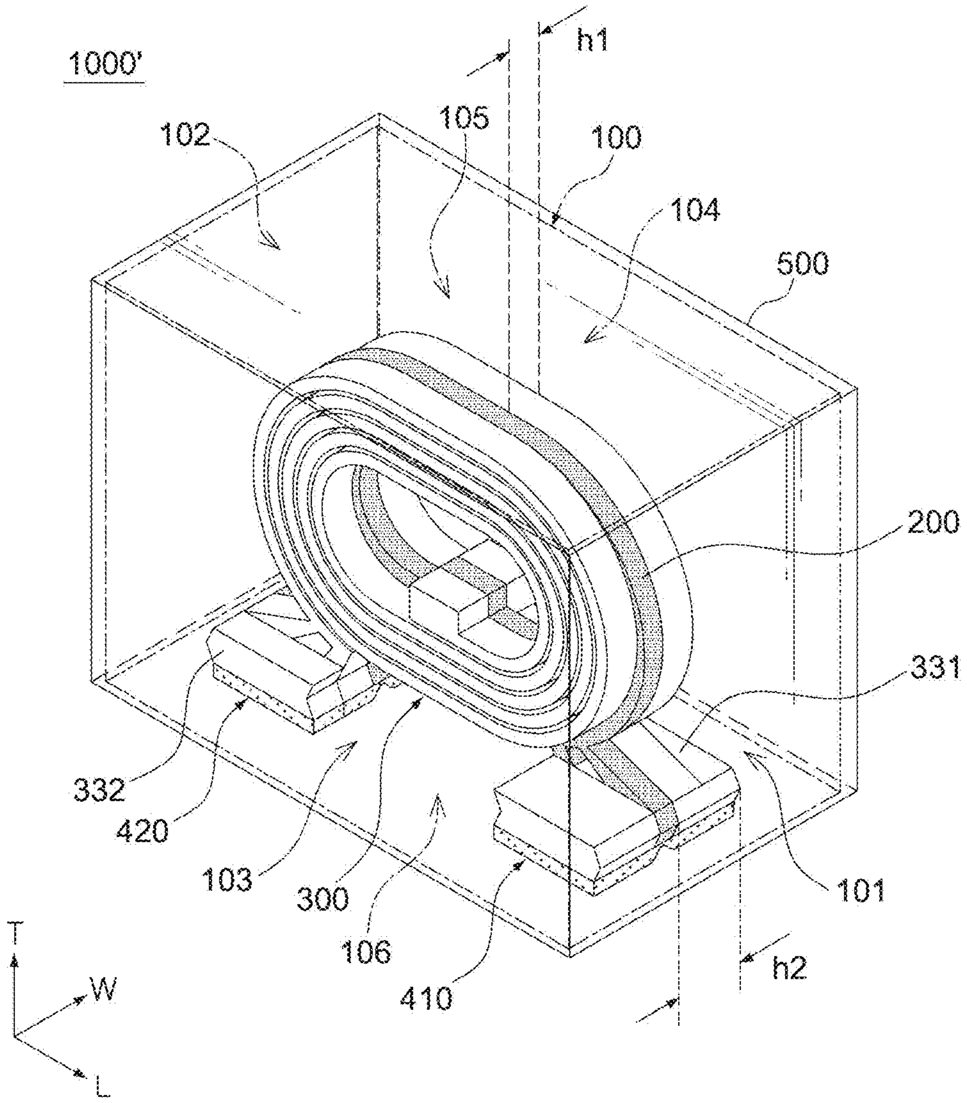
FIG. 5 is a perspective view schematically illustrating a coil component according to a modified example of an exemplary embodiment in the present disclosure.
Figure 6:
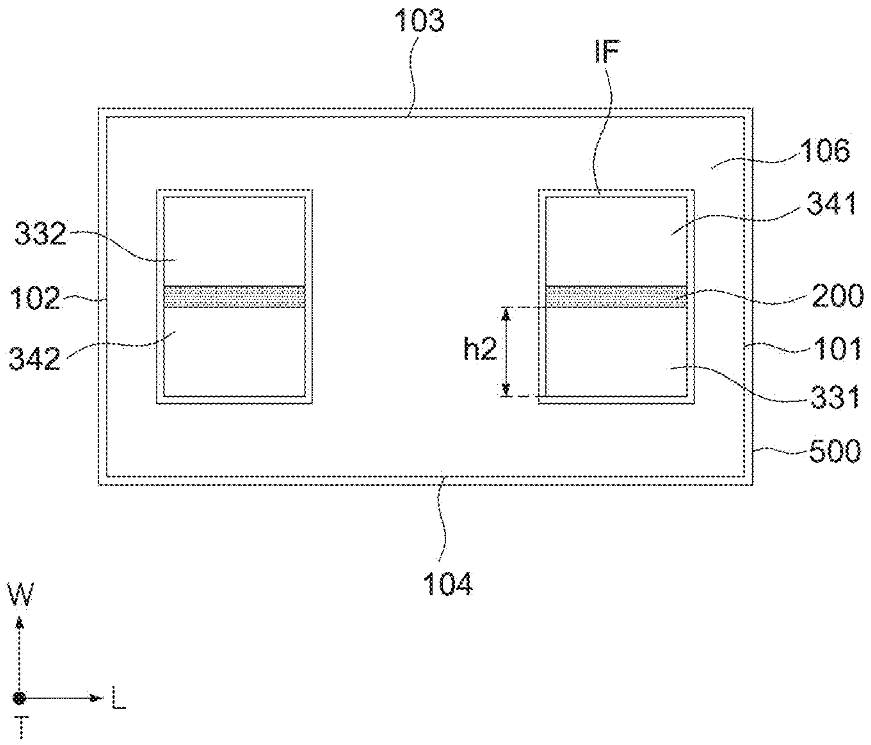
FIG. 6 is a view schematically illustrating the coil component according to a modified example of an exemplary embodiment in the present disclosure as viewed in the direction B of FIG. 1.
Figure 7:
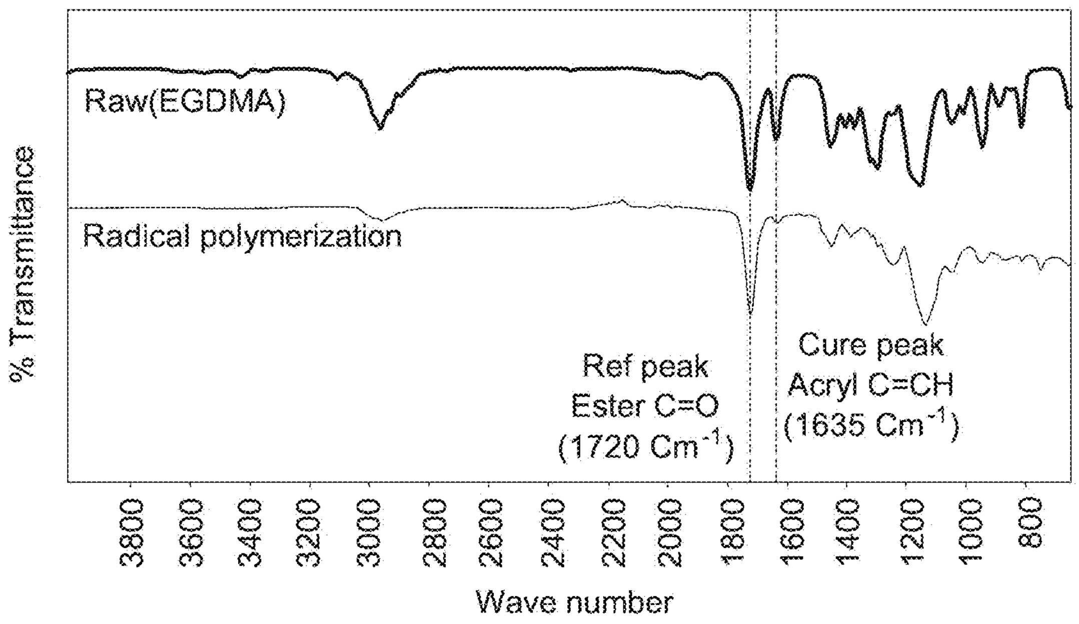
FIG. 7 is a diagram schematically illustrating transmission spectra of a standard sample containing ethylene glycol dimethacrylate (EGDMA) and a specimen according to a wave number to describe Fourier-transform infrared spectroscopy (FT-IR)
Figure 8:
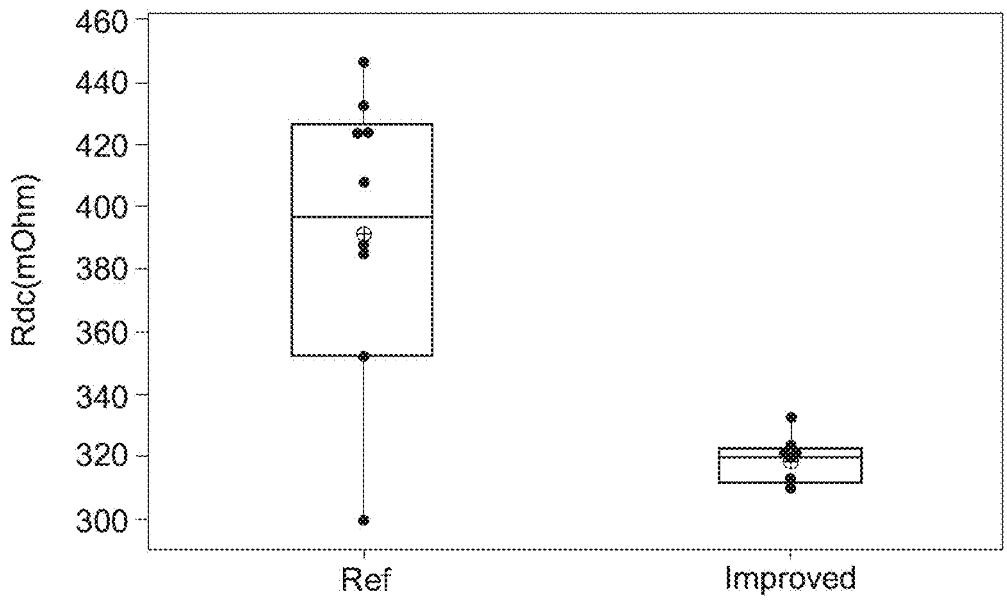
FIG. 8 is a diagram schematically illustrating resistance distribution of the coil component according to an exemplary embodiment in the present disclosure and resistance distribution according to a comparative example.

FIG. 1 is a view schematically illustrating a coil component according to an exemplary embodiment in the present disclosure. FIG. 2 is a view schematically illustrating the coil component according to an exemplary embodiment in the present disclosure as viewed from below. FIG. 3 is a view schematically illustrating the coil component according to an exemplary embodiment in the present disclosure as viewed in a direction A of FIG. 1. FIG. 4 is a view schematically illustrating the coil component according to an exemplary embodiment in the present disclosure as viewed in a direction B of FIG. 1. FIG. 5 is a perspective view schematically illustrating a coil component according to a modified example of an exemplary embodiment in the present disclosure. FIG. 6 is a view schematically illustrating the coil component according to a modified example of an exemplary embodiment in the present disclosure as viewed in the direction B of FIG. 1. FIG. 7 is a diagram schematically illustrating transmission spectra of a standard sample containing ethylene glycol dimethacrylate (EGDMA) and a specimen according to a wave number to describe Fourier-transform infrared spectroscopy (FT-IR). FIG. 8 is a view schematically illustrating resistance distribution of the coil component according to an exemplary embodiment in the present disclosure and resistance distribution according to a comparative example. Meanwhile, FIG. 2 illustrates the coil component as viewed from below, but a portion of a surface insulating layer 500 is omitted for better understanding of the present disclosure. In addition, FIG. 3 illustrates the coil component as viewed in the direction A of FIG. 1 and illustrates an internal structure of the coil component according to the present exemplary embodiment for understanding of the present disclosure. In addition, FIG. 4 illustrates the coil component as viewed in the direction B of FIG. 1, but an external electrode is omitted for better understanding of the present disclosure.

Referring to FIGS. 1 through 6, a coil component 1000 according to an exemplary embodiment in the present disclosure and a coil component 1000' according to a modified example may each include a body 100, an insulating substrate 200, a coil portion 300, an insulating film IF, and an external electrode portion 410 and 420, and may further include the surface insulating layer 500.

The body 100 may form an appearance of the coil component 1000 according to the present exemplary embodiment, and the coil portion 300 may be embedded in the body 100.

The body 100 may generally have a hexahedral shape.

The body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T in FIGS. 1 through 3. The first to fourth surfaces 101 to 104 of the body 100 may correspond to walls of the body 100 connecting the fifth and sixth surfaces 105 and 106 of the body 100 to each other. Hereinafter, opposite end surfaces (one end surface and the other end surface) of the body 100 may refer to the first and second surfaces 101 and 102 of the body 100, and opposite side surfaces (one side surface and the other side surface) of the body 100 may refer to the third and fourth surfaces 103 and 104 of the body 100. Further, one surface and the other surface of the body 100 may refer to the sixth and fifth surfaces 106 and 105 of the body 100, respectively. The sixth surface 106 of the body 100 may be used as a mounting surface when the coil component 1000 according to the present exemplary embodiment is mounted on a mounting board such as a printed circuit board.

The body 100 may be formed so that the coil component 1000 according to the present exemplary embodiment in which the external electrode portion 410 and 420 and the surface insulating layer 500 to be described later are formed has a length of 1.0 mm, a width of 0.5 mm, and a thickness of 0.8 mm by way of example, but is not limited thereto. Meanwhile, the above-described dimensions are merely values assumed in design, which do not reflect a process error or the like. Therefore, it should be understood that an allowable process error range also falls within the scope of the present disclosure.

The length of the coil component 1000 described above may refer to the largest value among dimensions of a plurality of line segments connecting two outermost boundary lines of the coil component 1000 facing each other in the length direction L and are parallel to the length direction L, in an image of a cross-section of a central portion of the coil component 1000 in the width direction W, the image being taken by an optical microscope or a scanning electron microscope (SEM), and the cross-section being taken along the length direction L and the thickness direction T. Alternatively, the length of the coil component 1000 may refer to the smallest value among the dimensions of the plurality of line segments connecting two outermost boundary lines of the coil component 1000 facing each other in the length direction L and are parallel to the length direction L, in the image of the cross-section. Alternatively, the length of the coil component 1000 may refer to an arithmetic means value of three or more dimensions of the plurality of line segments connecting two outermost boundary lines of the coil component 1000 facing each other in the length direction L and are parallel to the length direction L, in the image of the cross-section. Here, the plurality of line segments parallel to the length direction L may be equally spaced apart from each other in the thickness direction T, but the scope of the present disclosure is not limited thereto.

The thickness of the coil component 1000 described above may refer to the largest value among dimensions of a plurality of line segments connecting two outermost boundary lines of the coil component 1000 facing each other in the thickness direction T and are parallel to the thickness direction T, in the image of the cross-section of the central portion of the coil component 1000 in the width direction W, the image being taken by an optical microscope or a scanning electron microscope (SEM), and the cross-section being taken along the length direction L and the thickness direction T. Alternatively, the thickness of the coil component 1000 may refer to the smallest value among the dimensions of the plurality of line segments connecting two outermost boundary lines of the coil component 1000 facing each other in the thickness direction T and parallel to the thickness direction T, in the image of the cross-section. Alternatively, the thickness of the coil component 1000 may refer to an arithmetic means value of three or more dimensions of the plurality of line segments connecting two outermost boundary lines of the coil component 1000 facing each other in the thickness direction T and parallel to the thickness direction T, in the image of the cross-section. Here, the plurality of line segments parallel to the thickness direction T may be equally spaced apart from each other in the length direction L, but the scope of the present disclosure is not limited thereto.

The width of the coil component 1000 described above may refer to the largest value among dimensions of a plurality of line segments connecting two outermost boundary lines of the coil component 1000 facing each other in the width direction W and are parallel to the width direction W, in an image of a cross-section of a central portion of the coil component 1000 in the thickness direction T, the image being taken by an optical microscope or a scanning electron microscope (SEM), and the cross-section being taken along the length direction L and the width direction W. Alternatively, the width of the coil component 1000 may refer to the smallest value among the dimensions of the plurality of line segments connecting two outermost boundary lines of the coil component 1000 facing each other in the width direction W and are parallel to the width direction W, in the image of the cross-section. Alternatively, the width of the coil component 1000 may refer to an arithmetic means value of three or more dimensions of the plurality of line segments connecting two outermost boundary lines of the coil component 1000 facing each other in the width direction W and are parallel to the width direction W, in the image of the cross-section. Here, the plurality of line segments parallel to the width direction W may be equally spaced apart from each other in the length direction L, but the scope of the present disclosure is not limited thereto.

Alternatively, each of the length, the width, and the thickness of the coil component 1000 may be measured by a micrometer measurement method. According to the micrometer measurement method, measurement may be performed by zeroing a micrometer subjected to gage repeatability and reproducibility (R&R), inserting the coil component 1000 according to the present exemplary embodiment between tips of the micrometer, and turning a measurement lever of the micrometer. Meanwhile, when measuring the length of the coil component 1000 by the micrometer measurement method, the length of the coil component 1000 may refer to a value obtained by performing the measurement once, or an arithmetic mean of values obtained by performing the measurement multiple times. The same may apply to the width and the thickness of the coil component 1000.

The body 100 may contain metal magnetic powder and an insulating resin. Specifically, the body 100 may be formed by stacking one or more magnetic composite sheets containing an insulating resin and metal magnetic powder dispersed in the insulating resin.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based alloy powder, or Fe—Cr—Al-based alloy powder.

The metal magnetic powder may be amorphous or crystalline. For example, the metal magnetic powder may be Fe—Si—B—Cr based amorphous alloy powder, but is not necessarily limited thereto. The metal magnetic powder may have an average diameter of about 0.1 μm to 30 μm, but is not limited thereto.

The metal magnetic powder may include a first powder and a second powder having a smaller particle size than the first powder. In the present specification, the particle size or average diameter may mean particle size distribution expressed as $D_{90}$, $D_{50}$, or the like. According to the present disclosure, since the metal magnetic powder includes the first powder and the second powder having a smaller particle size than the first powder, the second powder may be disposed in a space between the first powder particles, and as a result, a magnetic material filling rate in the body 100 may be increased. Meanwhile, as another example in the present disclosure, the metal magnetic powder may include three types of powder particles having different particle sizes. An insulating coating layer may be formed on a surface of the metal magnetic powder, but is not limited thereto. The insulating coating layer may be an oxide film containing metal atoms, an inorganic insulating film such as SiOx, or an organic insulating film such as an epoxy resin, but the scope of the present disclosure is not limited thereto.

The insulating resin may include epoxy, polyimide, liquid crystal polymer (LCP), or the like, or mixtures thereof, but is not limited thereto.

The body 100 may include a core 110 penetrating through the insulating substrate 200 and the coil portion 300 to be described later. The core 110 may be formed by filling a through-hole of the coil portion 300 with the magnetic composite sheet, but is not limited thereto.

The insulating substrate 200 may be disposed in the body 100. The insulating substrate 200 may be a component supporting the coil portion 300 to be described later.

The insulating substrate 200 may be formed of an insulating material including a thermosetting insulating resin such as an epoxy resin, a thermoplastic insulating resin such as a polyimide resin, or a photosensitive insulating resin. Alternatively, the insulating substrate 200 may be formed of an insulating material having a reinforcement material such as a glass fiber or an inorganic filler impregnated in the insulating resin described above. For example, the insulating substrate 200 may be formed of a material such as prepreg, an Ajinomoto Build-up Film (ABF), FR-4, a Bismaleimide Triazine (BT) resin, a photoimagable dielectric (PID), or a copper clad laminate (CCL), but is not limited thereto.

As the inorganic filler, at least one selected from the group consisting of silica ($SiO_2$), alumina ($Al_2O_3$), silicon carbide (SiC), barium sulfate ($BaSO_4$), talc, clay, mica powder particles, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

In a case where the insulating substrate 200 is formed of the insulating material including the reinforcement material, the insulating substrate 200 may provide more excellent rigidity. In a case where the insulating substrate 200 is formed of an insulating material that does not include a glass fiber, the insulating substrate 200 may be advantageous in decreasing a total thickness of the insulating substrate 200 and the coil portion 300 (that is, the sum of dimensions of the coil portion and the insulating substrate in the width direction W of FIG. 1) to decrease the width of the component. In a case where the insulating substrate 200 is formed of the insulating material including the photosensitive insulating resin, the number of processes for forming the coil portion 300 may be decreased, which is advantageous in decreasing a production cost, and a fine via may be formed.

The coil portion 300 may be disposed in the body 100. According to the present exemplary embodiment, the coil portion 300 may be disposed on the insulating substrate 200 and disposed in the body 100. The coil portion 300 may be embedded in the body 100, and may implement the characteristic of the coil component. For example, in a case where the coil component 1000 according to the present exemplary embodiment is used as a power inductor, the coil portion 300 may serve to store an electric field as a magnetic field to maintain an output voltage, thereby stabilizing power of an electronic device.

The coil portion 300 may be formed on at least one of opposite surfaces of the insulating substrate 200 facing each other and may form at least one turn. The coil portion 300 may be disposed on one surface and the other surface of the insulating substrate 200 facing each other in the width direction W of the body 100, and may be disposed so as to be perpendicular to the sixth surface 106 of the body 100 as a whole. According to the present exemplary embodiment, the coil portion 300 may include coil patterns 311 and 312, vias 321, 322, and 333, and lead-out terminal portions 331 and 341 and 332 and 342. Meanwhile, since the second and third vias 322 and 323 and first and second sub-lead-out terminals 341 and 342 are optional components, and may thus be omitted in the present exemplary embodiment.

The first coil pattern 311 and the second coil pattern 312 may be disposed on the opposite surfaces of the insulating substrate 200, respectively, and may each have a planar spiral shape forming at least one turn around the core 110 of the body 100. As an example, the first coil pattern 311 may be disposed on a back surface of the insulating substrate 200 in the direction of FIG. 1 and may form at least one turn around the core 110. The second coil pattern 312 may be disposed on a front surface of the insulating substrate 200 and may form at least one turn around the core 110. Each of the first and second coil patterns 311 and 312 may be formed so that an end portion of the outermost turn connected to the lead-out terminal 331 or 332 extends from a central portion of the body 100 in the thickness direction T of the body 100 toward the sixth surface 106 of the body 100. As a result, the first and second coil patterns 311 and 322 may increase the number of turns of the entire coil portion 300 as compared to a case in which an end portion of the outermost turn of the coil is formed only at the central portion of the body 100 in the thickness direction T.

The lead-out terminal portions 331 and 341 and 332 and 342 may be exposed to the sixth surface 106 of the body 100 while being spaced apart from each other. In some embodiments, the lead-out terminal portions 331 and 341 and 332 and 342 may extend from the sixth surface 106. The lead-out terminal portions 331 and 341 and 332 and 342 may include lead-out terminals 331 and 332, and the sub-lead-out terminals 341 and 342. Specifically, the first lead-out terminal portion 331 and 341 may include the first lead-out terminal 331 extending from the first coil pattern 311 on the back surface of the insulating substrate 200 and exposed to the sixth surface 106 of the body 100, and the first sub-lead-out terminal 341 disposed at a position corresponding to the first lead-out terminal 331 on the front surface of the insulating substrate 200, having a shape corresponding to the first lead-out terminal 331, and spaced apart from the second coil pattern 312, in the direction of FIG. 1. The second lead-out terminal portion 332 and 342 may include the second lead-out terminal 332 extending from the second coil pattern 312 on the front surface of the insulating substrate 200 and exposed to the sixth surface 106 of the body 100, and the second sub-lead-out terminal 342 (see FIG. 2) disposed at a position corresponding to the second lead-out terminal 332 on the back surface of the insulating substrate 200, having a shape corresponding to the second lead-out terminal 332, and spaced apart from the first coil pattern 311. The first lead-out terminal portion 331 and 341 and the second lead-out terminal portion 332 and 342 may be exposed to the sixth surface of the body 100 while being spaced apart from each other, and may be in contact with first and second external electrodes 410 and 420 to be described later, respectively. Each of the lead-out terminals 331 and 332 and the sub-lead-out terminals 341 and 342 may have a perforated portion penetrating through each of the lead-out terminals 331 and 332 and the sub-lead-out terminals 341 and 342. At least a portion of the body 100 may be disposed in the perforated portion to improve a coupling force between the body 100 and the coil portion 300 (anchoring effect). Further, the perforated portion may penetrate through the insulating substrate 200 disposed between the lead-out terminals 331 and 332 and the sub-lead-out terminals 341 and 342, but the scope of the present disclosure is not limited thereto.

Meanwhile, since the above-described sub-lead-out terminals 341 and 342 are components that may be omitted in the present exemplary embodiment in consideration of an electrical connection relationship between the coil portion 300 and the first and second external electrodes 410 and 420 to be described later, a case in which the sub-lead-out terminals 341 and 342 are omitted may also fall within the scope of the present disclosure. However, in a case where the lead-out terminal portions 331 and 341 and 332 and 342 include the lead-out terminals 331 and 332 and the sub-lead-out terminals 341 and 342 as in FIGS. 1 and 2, the first and second external electrodes 410 and 420 formed on the sixth surface 106 of the body 100 may be formed symmetrically, thereby reducing a defect in appearance.

The first via 321 may penetrate through the insulating substrate 200 and connect inner end portions of the innermost turns of the first and second coil patterns 311 and 312 to each other. The second via 322 may penetrate through the insulating substrate 200 and connect the first lead-out terminal 331 and the first sub-lead-out terminal 341 to each other. The third via 323 may penetrate through the insulating substrate 200 and connect the second lead-out terminal 332 and the second sub-lead-out terminal 342 to each other. By doing so, the coil portion 300 may function as a single coil connected as a whole. Meanwhile, since the sub-lead-out terminals 341 and 342 are components irrelevant to the electrical connection relationship between the coil portion 300 and the first and second external electrodes 410 and 420 to be described later as described above, a case in which the second and third vias 322 and 323 are omitted may also fall within the scope of the present disclosure. However, when the lead-out terminals 341 and 342 and the sub-lead-out terminals 341 and 342 are connected through the second and third vias 322 and 323 as in the present exemplary embodiment, reliability of connection between the coil portion 300 and the first and second external electrodes 410 and 420 may be improved.

At least one of the coil patterns 311 and 312, the vias 321, 322, and 323, the lead-out terminals 331 and 332, and the sub-lead-out terminals 341 and 342 may include at least one conductive layer.

For example, in a case where the second coil pattern 312, the vias 321, 322, and 323, the second lead-out terminal 332, and the first sub-lead-out terminal 341 are formed on the front surface (in the direction of FIG. 1) of the insulating substrate 200 by plating, each of the second coil pattern 312, the vias 321, 322, and 323, the second lead-out terminal 332, and the first sub-lead-out terminal 341 may include a seed layer and an electroplating layer. The seed layer may be formed by an electroless plating method, a vapor deposition method such as sputtering, or the like. Each of the seed layer and the electroplating layer may have a single-layer structure or have a multilayer structure. The electroplating layer having the multilayer structure may be formed in a conformal film structure in which one electroplating layer is covered by another electroplating layer, or may be formed in a shape in which one electroplating layer is stacked on only one surface of another electroplating layer. The seed layers of the second coil pattern 312, the first via 321, and the second lead-out terminal 332 may be formed integrally with each other, such that a boundary is not formed therebetween. However, the seed layers are not limited thereto. The electroplating layers of the second coil pattern 312, the first via 321, and the second lead-out terminal 332 may be formed integrally with each other, such that a boundary is not formed therebetween. However, the electroplating layers are not limited thereto.

Each of the coil patterns 311 and 312, the vias 321, 322, and 323, the lead-out terminals 331 and 332, and the sub-lead-out terminals 341 and 342 may be formed of a conductive material such as copper (Cu), aluminum (Al), silver (Ag), tin (Sn), gold (Au), nickel (Ni), lead (Pb), titanium (Ti), chromium (Cr), molybdenum (Mo), or alloys thereof, but is not limited thereto.

Since the coil portion 300 may be disposed perpendicular to the sixth surface 106 of the body 100, which is the mounting surface, a mounting area may be reduced while maintaining a volume of the body 100 and a volume of the coil portion 300. For this reason, a larger number of electronic components may be mounted on the mounting board having the same area. In addition, for the above reason, a direction of a magnetic flux induced to the core 110 by the coil portion 300 may be disposed parallel to the sixth surface 106 of the body 100. Accordingly, noise induced to the mounting surface of the mounting substrate may be relatively reduced.

Referring to FIGS. 5 and 6, in the coil component 1000' according to a modified example of the present exemplary embodiment, a height h1 (a dimension in the W direction in FIG. 5) of each of the coil patterns 311 and 312 and a height h2 (a dimension in the W direction in FIG. 5) of each of the lead-out terminal portions 331 and 341 and 332 and 342 are different from each other. For example, the height h1 of the first coil pattern 311 may be smaller than the height h2 of each of the first lead-out terminal 331 and the second sub-lead-out terminal 342. As a result, in this modified example, an area of a portion of each of the first and second lead-out terminals 331 and 332 and the first and second sub-lead-out terminals 341 and 342 that is exposed to (or extend from) the sixth surface 106 of the body 100 may be increased. Accordingly, the reliability of connection between the coil portion 300 and the first and second external electrodes 410 and 420 may be improved by increasing a contact area between the coil portion 300 and the first and second external electrodes 410 and 420. As an example for implementing the above-described structure, the number of electroplating layers of each of the first and second lead-out terminal portions 331 and 341 and 332 and 342 may be larger than the number of electroplating layers of each of the first and second coil patterns 311 and 312 by one or more. Meanwhile, although only the height h1 of the first coil pattern 311 and the height h2 of the first lead-out terminal 331 are illustrated in FIG. 5, this is only an example. That is, the above-described height relationship between the first coil pattern 311 and the first lead-out terminal 331 may be equally applied to a height relationship between the first coil pattern 311 and the first sub-lead-out terminal 341, a height relationship between the second coil pattern 312 and the second lead-out terminal 332, and a height relationship between the second coil pattern 312 and the second sub-lead-out terminal 342. The heights disclosed herein may be measured by using an optical microscope or a scanning electron microscope (SEM). Other methods and/or tools appreciated by one of ordinary skill in the art, even if not described in the present disclosure, may also be used.

The external electrode portion 410 and 420 may be disposed on the body 100 and connected to the coil portion 300. According to the present exemplary embodiment, the external electrode portion 410 and 420 may include the first and second external electrodes 410 and 420 disposed on the sixth surface 106 of the body 100 while being spaced apart from each other. Specifically, the first external electrode 410 may be disposed on the sixth surface 106 of the body 100, and be in contact with each of the first lead-out terminal 331 and the first sub-lead-out terminal 341. The second external electrode 420 may be disposed on the sixth surface 106 of the body 100 so as to be spaced apart from the first external electrode 410, and be in contact with each of the second lead-out terminal 332 and the second sub-lead-out terminal 342. Meanwhile, for example, the insulating substrate 200 may be disposed between the first lead-out terminal 331 and the first sub-lead-out terminal 341 and exposed to the sixth surface 106 of the body 100. In this case, a recess may be formed in a region of the first external electrode 410 that corresponds to the insulating substrate 200 exposed to the sixth surface 106 of the body 100 due to plating deviation, but the recess is not necessarily formed.

The first and second external electrodes 410 and 420 may electrically connect the coil component 1000 to a printed circuit board or the like when the coil component 1000 according to the present exemplary embodiment is mounted on the printed circuit board or the like. For example, the coil component 1000 according to the present exemplary embodiment may be mounted so that the sixth surface 106 of the body 100 faces an upper surface of the printed circuit board, and the first and second external electrodes 410 and 420 spaced apart from each other on the sixth surface of the body 100 may be electrically connected to connection portions of the printed circuit board.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but are not limited thereto.

Each of the first and second external electrodes 410 and 420 may include a plurality of layers. For example, the first external electrode 410 may include a first layer 411 that is in contact with the first lead-out terminal portion 331 and 341, and second and third layers 412 and 413 disposed on the first layer 411. Here, as an example, the first layer may be a conductive resin layer containing conductive powder including at least one of copper (Cu) or silver (Ag) and an insulating resin, or as another example, the first layer may be a copper (Cu) plating layer. The second layer 412 may contain nickel (Ni). For example, the second layer 412 may be a nickel (Ni) plating layer. The third layer 413 may contain tin (Sn). For example, the third layer 413 may be a tin (Sn) plating layer.

The insulating film IF may be disposed between the coil portion 300 and the body 100, and may contain a thermosetting resin having a vinyl group. The insulating film IF may electrically insulate the coil portion 300 and the body 100 from each other.

The insulating film IF may be formed in a conformal film shape, and may be formed in a shape corresponding to an outline formed by the coil portion 300 and the insulating substrate 200. In this case, electrical insulation between the coil portion 300 and the body 100 may be ensured while significantly reducing a volume occupied by the insulating film IF in the body 100. For example, the insulating film IF may be formed by performing a process of removing a portion of the insulating substrate 200 on which the coil portion 300 is formed (trimming which is a process of removing a region of the plate-shaped insulating substrate where the coil portion is not formed) and then performing vapor deposition (VD), but the scope of the present disclosure is not limited thereto.

The insulating film IF may contain the thermosetting resin having a vinyl group.

In a case of a thin-film type coil component in which a coil is formed by plating on an insulating substrate, generally, coils, coil insulating films, and bodies of a plurality of individual components are collectively formed on a large-area substrate (also called a coil bar), and dicing is performed to separate the bodies of the plurality of individual components connected to each other. Thereafter, an external electrode and a surface insulating layer are formed on the body of the individual component. Meanwhile, in the dicing, the coil insulating film formed on a surface of the coil is also diced. The coil insulating film may be elongated and attached to a surface of the body of the individual component during the dicing, resulting in a defect in appearance and a defect in a process of forming the external electrode. For this reason, according to the related art, a process (grinding) for removing the coil insulating film elongated and attached to the surface of the body by the dicing may need to be additionally performed after performing the dicing.

According to the present exemplary embodiment, the insulating film IF may contain the thermosetting resin having a vinyl group in order to solve the problem that the coil insulating film is elongated in the above-described dicing. Since the insulating film IF contains the thermosetting resin having a vinyl group, an elongation ratio of the insulating film IF in the dicing may be reduced. Therefore, even in a case where the above-described additional process (grinding) according to the related art is omitted, reliability of coupling between the coil portion 300 and the external electrode portion 410 and 420 may be ensured, and a resistance may be reduced. In some embodiments, the thermosetting resin may be crosslinked.

FIG. 8 is a diagram illustrating measurement of resistances (Rdc) according to a comparative example (Ref) (grinding is not added) using the coil insulating film according to the related art and the present exemplary embodiment (Improved). A total of 20 resistances (Rdc) were measured by preparing 10 samples according to the comparative example and 10 samples according to the present exemplary embodiment. The comparative example and the present exemplary embodiment are different only in regard to the material of the insulating film IF, and the remaining conditions (for example, the total number of turns of the coil portion, the volume of the coil portion, the size of the body, a formation area and thickness of the external electrode) were identical to each other. Referring to FIG. 8, in the comparative example, it may be appreciated that the resistance (Rdc) between the coil portion and the external electrode is increased due to a relatively high elongation ratio of the coil insulating film in the dicing, and resistance (Rdc) distribution between the coil portion and the external electrode is relatively large due to the non-uniform elongation ratio. In contrast, in the present exemplary embodiment, since the elongation ratio of the insulating film IF in the dicing is relatively low and uniform, the resistance (Rdc) between the coil portion and the external electrode is relatively low, and the resistance (Rdc) distribution between the coil portion and the external electrode is relatively small.

The thermosetting resin having a vinyl group may include at least one selected from the group consisting of 2,4,6,8-tetramethyl-2,4,6,8-tetravinylcyclotetrasiloxane (V4D4), 1,3,5-trimethyl-1,3,5-trivinylcyclotrisiloxane (V3D3), 1,3-diethenyl-1,1,3,3-tetramethyl-disiloxane (V2D2), 4-vinylpyridine (4VP), divinylbenzene (DVB), diethyleneglycol divinylether (DEGDVE), ethylene glycol diacrylate (EGDA), ethylene glycol dimethacrylate (EGDMA), glycidyl methacrylate (GMA), ethylene, styrene, and methyl methacrylate (MMA).

Hereinafter, a method for determining whether or not the insulating film IF contains the thermosetting resin having a vinyl group will be described. First, components (for example, the first and second external electrodes) formed on the sixth surface 106 of the body 100 may be removed from a final product to expose the sixth surface 106 of the body 100, and arbitrary eight points may be set in a region corresponding to the insulating film IF exposed to the sixth surface 106 of the body 100. Further, a cross-section of a central portion of the final product in the length direction L is taken along the width direction W and the thickness direction T, and arbitrary eight points are set in a region corresponding to the insulating film (IF) in the cross-section. Next, Fourier-transform infrared spectroscopy (FT-IR) may be performed on each of the above-described 16 points to obtain an absorption spectrum of the sample according to the wave number or transmittance indicating the absorption spectrum.

The absorption spectrum of the specimen sample obtained as described above may be compared with an absorption spectrum of a standard sample of the thermosetting resin having a vinyl group to determine whether or not the specimen sample contains the thermosetting resin having a vinyl group. For example, referring to FIG. 7, in the standard sample containing ethylene glycol dimethacrylate (EGDMA), absorption occurs at a wave number corresponding to an ester group and an acryl group. In a case where the absorption spectrum of the specimen sample obtained from each of the above-described 16 points occurs at the same wave number as that of the absorption spectrum of the EGDMA standard sample, it may be determined that the specimen sample is an insulating material containing EGDMA.

Meanwhile, the absorption spectrum of the standard sample and the absorption spectrum of any one of 16 specimen samples are shown on the upper and lower sides of FIG. 7, respectively, and a y axis represents the transmittance (%) indicating the degree of absorption of each sample at a specific wave number.

The insulating film IF may have a glass transition temperature (Tg) higher than 100° C. In a case where the glass transition temperature (Tg) of the insulating film IF is equal to or lower than 100° C., the insulating film IF is relatively greatly elongated during the dicing, thereby causing the above-described problem in the related art. The glass transition temperature (Tg) of the insulating film (IF) may be confirmed in the final product through an analysis method such as differential scanning calorimetry (DSC).

A thickness of the insulating film IF may be 1 μm or more and 10 μm or less. In a case where the thickness of the insulating film IF is less than 1 μm, the insulating film IF may be insufficiently formed, or the surface of the coil portion 300 may have a region in which the insulating film IF is not formed, it may thus be difficult to electrically insulate the coil portion 300 and the body 100 from each other. In a case where the thickness of the insulating film IF exceeds 10 μm, the volume occupied by the insulating film IF in the body 100 may be increased with respect to the same size of the component, such that a volume of a magnetic material may be decreased. Meanwhile, the thickness of the insulating film IF may refer to a dimension of the insulating film IF disposed on an outer side of the outermost turn of the coil portion in the thickness direction T, in the image of the cross-section of the central portion of the coil component 1000 in the width direction W, the image being taken by an optical microscope or an SEM, and the cross-section being taken along the length direction L and the thickness direction T. Here, the dimension of the insulating film IF in the thickness direction T may be an arithmetic mean value of dimensions of a plurality of different regions of the insulating film IF in a case where measurement is performed on the plurality of different regions of the insulating film IF.

Table 1 below shows an insulation voltage (V) and an occupancy rate (%) of the insulating film (IF) in the component respectively measured while changing the thickness of the insulating film (IF). All of Experimental Examples 1 to 13 in Table 1 below were based on a 0804 0.65T product (L*W*T=0.8 mm*0.4 mm*0.65 mm), and only the thickness of the insulating film (IF) was changed, and the remaining factors, for example, the total number of turns of the coil, the thickness of the external electrode, and the like are the same.

A reference insulation voltage was set to 40 V or higher, but an insulation voltage of 39.8 V or higher was determined as pass in consideration of an error (0.5%). A reference occupancy rate in the component was set to 15% or less, but an occupancy rate of 15.07% or less was determined as pass in consideration of an error (0.5%).

TABLE 1

| | Thickness (μm) | Insulation voltage (V) | Occupancy rate (%) |
|---|---|---|---|
| #1 | 0.8 | 34.4 | 1.87 |
| #2 | 0.9 | 38.7 | 2.09 |
| #3 | 1 | 43 | 2.31 |
| #4 | 2 | 86 | 4.36 |
| #5 | 3 | 129 | 6.20 |
| #6 | 4 | 172 | 7.85 |
| #7 | 5 | 215 | 9.34 |
| #8 | 6 | 258 | 10.69 |
| #9 | 7 | 301 | 11.92 |
| #10 | 8 | 344 | 13.05 |
| #11 | 9 | 387 | 14.07 |
| #12 | 10 | 430 | 15.02 |
| #13 | 10.1 | 434.3 | 15.11 |

Experimental Examples 3 to 12, that is, Experimental Examples in which the thickness of the insulating film IF is 1 μm or more and 10 μm or less, satisfy the above-described insulation voltage condition and the occupancy rate condition of the insulating film IF in the component.

Each of Experimental Examples 1 and 2 does not satisfy the above-described insulation voltage condition, which is because the insulating film IF is insufficiently formed, or the surface of the coil portion 300 has a region in which the insulating film IF is not formed, and it may thus be difficult to electrically insulate the coil portion 300 and the body 100 from each other.

Experimental Example 13 does not satisfy the above-described occupancy rate condition of the insulating film IF in the component, and therefore, the volume of the magnetic material may be decreased with respect to the same size of the component, and as a result, the characteristic of the component deteriorates.

The surface insulating layer 500 may be disposed on each of the first to sixth surfaces 101 to 106 of the body 100. The surface insulating layer 500 may extend from the fifth surface 105 of the body 100 to at least a portion of each of the first to fourth surfaces 101 to 104, and the sixth surface 106. In the present exemplary embodiment, the surface insulating layer 500 may be disposed on each of the first to fifth surfaces 101 to 105 of the body 100, and may be disposed in a region of the sixth surface 106 of the body 100 except for regions in which the first and second external electrodes 410 and 420 are disposed. The surface insulating layer 500 may prevent a short circuit between the coil component 1000 according to the present exemplary embodiment and another component adjacent to the coil component 1000 according to the present exemplary embodiment when the coil component 1000 according to the present exemplary embodiment is mounted on the mounting board or the like.

At least portions of the surface insulating layer 500 that are disposed on the first to sixth surfaces 101 to 106 of the body 100, respectively, may be formed in the same process and may thus be formed integrally with each other, such that a boundary is not formed therebetween. However, the scope of the present disclosure is not limited thereto.

The surface insulating layer 500 may contain a thermoplastic resin such as polystyrenes, vinyl acetates, polyesters, polyethylenes, polypropylenes, polyamides, rubbers, or acryls, a thermosetting resin such as phenols, epoxies, urethanes, melamines, or alkyds, a photosensitive resin, parylene, $SiO_x$, or $SiN_x$. The surface insulating layer 500 may further contain an insulating filler such as an inorganic filler, but is not limited thereto.

By doing so, the coil component 1000 according to the present exemplary embodiment may solve a problem caused by the insulating film IF being relatively greatly elongated during the dicing even when a plurality of bodies 100 are collectively manufactured in a large-scale process. In addition, according to the related art, a process (grinding) of removing the elongated coil insulating film for reliability of connection between the coil portion and the external electrode is required to be performed between the dicing and the formation of the external electrode. However, according to the present exemplary embodiment, such a process may be minimized or eliminated. Accordingly, the coil component 1000 according to the present exemplary embodiment may reduce a defect in appearance of the component and stably secure reliability of connection between the coil portion 300 and the first and second external electrodes 410 and 420.

In the above description, a case where the coil component 1000 includes the insulating substrate 200 disposed in the body 100 and the coil portion 300 is disposed on the insulating substrate 200 has been assumed and described, but the scope of the present disclosure is not limited thereto. That is, according to another modified example of the present exemplary embodiment, the coil portion 300 may be a winding coil formed by winding a metal wire whose surface is coated with a coating layer, and as a result, the above-described insulating substrate 200 does not have to be included. In this case, the above-described insulating film IF may be applied to the coating layer of the winding coil as it is.

Figure 9:
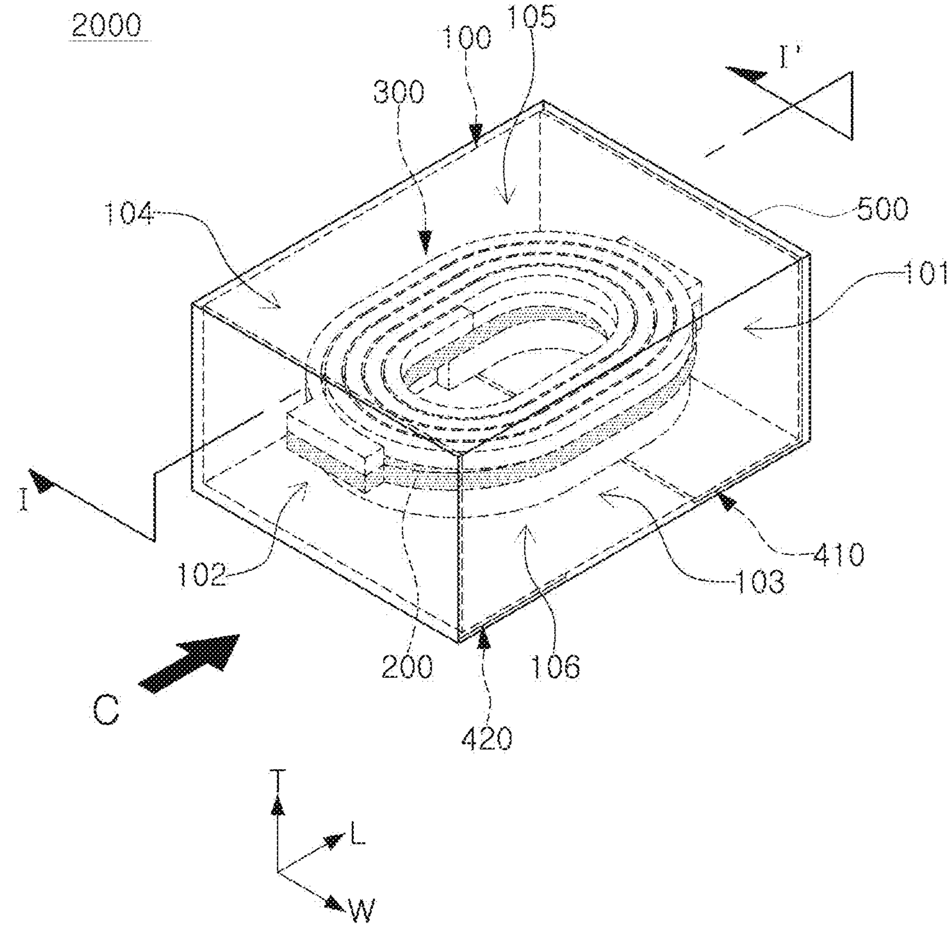
FIG. 9 is a perspective view schematically illustrating a coil component according to another exemplary embodiment in the present disclosure.
Figure 10:
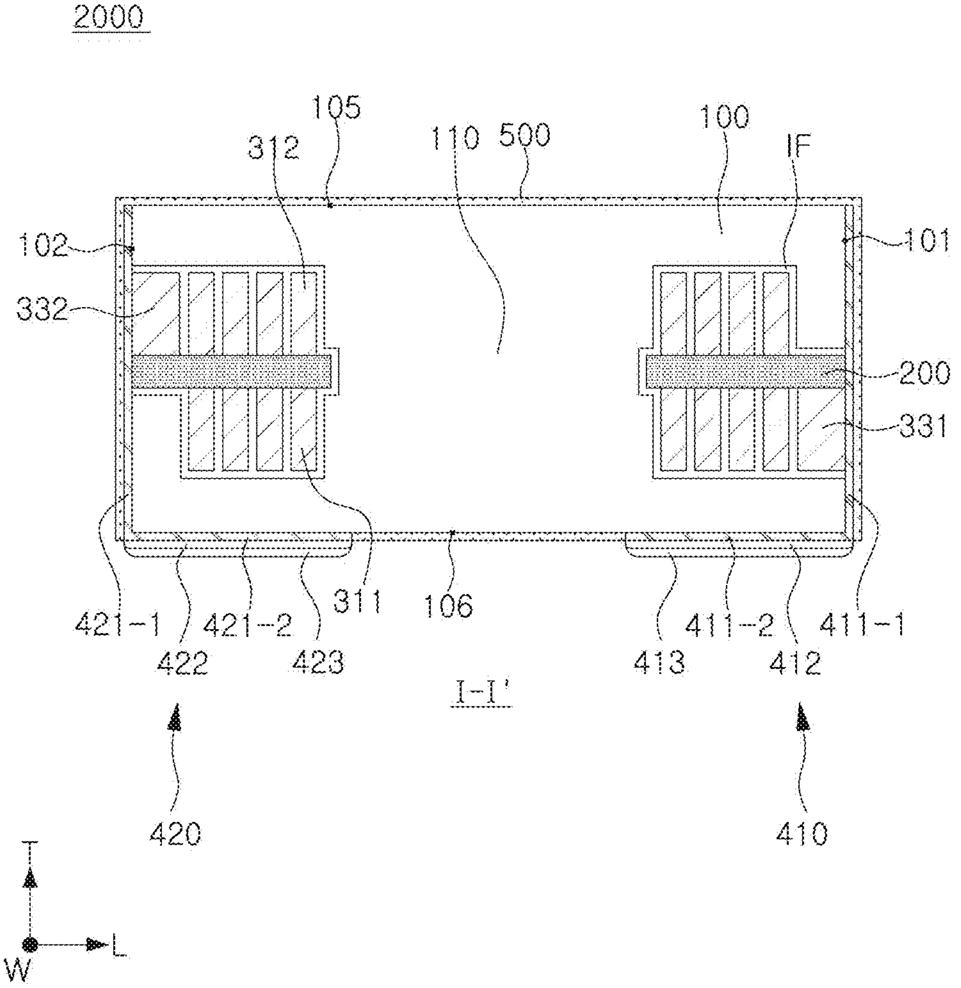
FIG. 10 is a cross-sectional view taken along line I-I' of FIG. 9.
Figure 11:
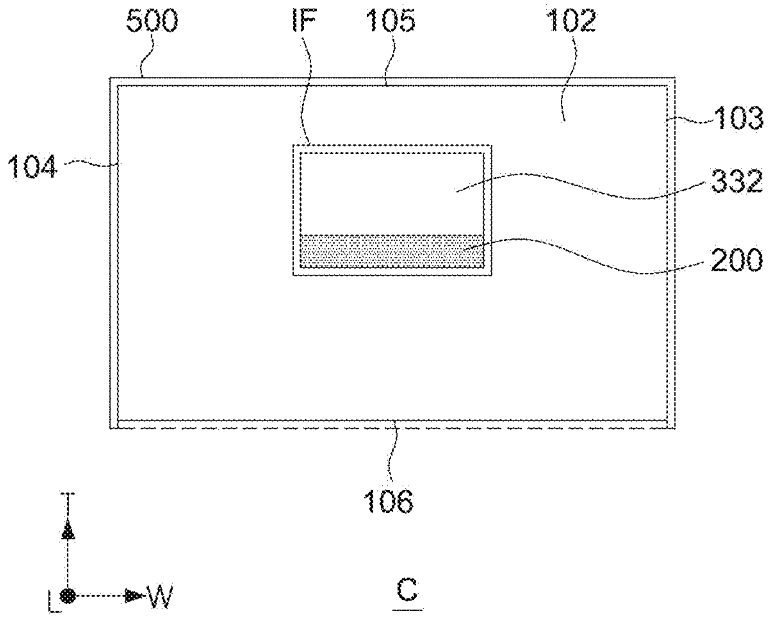
FIG. 11 is a view schematically illustrating the coil component according to another exemplary embodiment in the present disclosure as viewed in a direction C of FIG. 9.

FIG. 9 is a perspective view schematically illustrating a coil component according to another exemplary embodiment in the present disclosure. FIG. 10 is a cross-sectional view taken along line I-I' of FIG. 9. FIG. 11 is a view schematically illustrating the coil component according to another exemplary embodiment in the present disclosure as viewed in a direction C of FIG. 9. Meanwhile, FIG. 11 illustrates the coil component as viewed in the direction C of FIG. 9, but external electrodes and a part of a surface insulating layer are omitted for better understanding of the present disclosure.

Referring to FIGS. 1 through 6 and 9 through 10, a coil component 2000 according to the present exemplary embodiment is different from the coil component 1000 according to an exemplary embodiment in the present disclosure in regard to a disposition structure of a coil portion 300 and first and second external electrodes 410 and 420. Therefore, in describing the present exemplary embodiment, the disposition structure of the coil portion 300 and the first and second external electrodes 410 and 420 different from those of an exemplary embodiment in the present disclosure will be mainly described. For the rest of the configuration of the present exemplary embodiment, the description in an exemplary embodiment in the present disclosure may be applied as it is. The modified examples described in an exemplary embodiment in the present disclosure may also be applied to the present exemplary embodiment as it is.

Referring to FIGS. 9 and 10, in the present exemplary embodiment, one surface of an insulating substrate 200 may face a sixth surface 106 of a body 100, which is a mounting surface, and thus, the coil portion 300 may be disposed in the body 100 while being parallel to the sixth surface 106 of the body 100 as a whole.

Specifically, referring to FIGS. 9 and 10, in the coil portion 300 applied to the present exemplary embodiment, in the direction in FIGS. 9 and 10, a first coil pattern 311 and a first lead-out terminal 331 may be disposed on a lower surface of the insulating substrate 200 that faces the sixth surface 106 of the body 100, and a second coil pattern 312 and a second lead-out terminal 332 may be disposed on an upper surface of the insulating substrate 200 that opposes the lower surface of the insulating substrate 200. The first and second lead-out terminals 331 and 332 may be connected to the first and second coil patterns 311 and 312, exposed to first and second surfaces 101 and 102 of the body 100, and connected to the first and second external electrodes 410 and 420, respectively. Therefore, the coil portion 300 may function as one coil as a whole between the first and second external electrodes 410 and 420.

Each of the first coil pattern 311 and the second coil pattern 312 may have a planar spiral shape forming at least one turn around a core 110. As an example, the first coil pattern 311 may form at least one turn around the core 110 on the lower surface of the insulating substrate 200.

The lead-out terminals 331 and 332 may be exposed to the first and second surfaces 101 and 102 of the body 100, respectively. Specifically, the first lead-out terminal 331 may be exposed to the first surface 101 of the body 100, and the second lead-out terminal 332 may be exposed to the second surface 102 of the body 100. In some embodiments, the first lead-out terminal 331 may extend from the first surface 101 of the body 100, and the second lead-out terminal 332 may extend from the second surface 102 of the body 100.

Each of the first and second external electrodes 410 and 420 may include first to third layers 411, 412, and 413, and 421, 422, and 423. The first layer 411 may include a pad portion 411-2 and a connection portion 411-1, and the first layer 421 may include a pad portion 421-2 and a connection portion 421-1, the pad portions 411-2 and 421-2 being disposed on the sixth surface 106 of the body 100 while being spaced apart from each other, and the connection portions 411-1 and 421-1 being disposed on the first and second surfaces 101 and 102 of the body 100, respectively. Specifically, the first layer 411 of the first external electrode 410 may be disposed on the first surface 101 of the body 100 and include the first connection portion 411-1 that is disposed on the first surface 101 of the body 100 and is in contact with the first lead-out terminal 331 exposed to the first surface 101 of the body 100, and the first pad portion 411-2 extending from the first connection portion 411-1 to the sixth surface 106 of the body 100. The first layer 421 of the second external electrode 420 may be disposed on the second surface 102 of the body 100 and include the second connection portion 421-1 that is disposed on the second surface 102 of the body 100 and is in contact with the second lead-out terminal 332 exposed to the second surface 102 of the body 100, and the second pad portion 421-2 extending from the second connection portion 421-1 to the sixth surface 106 of the body 100. The first and second pad portions 411-2 and 421-2 may be disposed on the sixth surface 106 of the body 100 while being spaced apart from each other. The connection portions 411-1 and 421-1 and the pad portions 411-2 and 421-2 may be formed together in the same process and may thus be formed integrally with each other, such that a boundary is not formed therebetween. However, the scope of the present disclosure is not limited thereto.

A surface insulating layer 500 may cover the first and second external electrodes 410 and 420 disposed on the first and second surfaces 101 and 102 of the body 100, respectively. Specifically, the surface insulating layer 500 may cover the connection portions 411-1 and 421-1 of the first and second external electrodes 410 and 420.

As set forth above, according to the exemplary embodiment in the present disclosure, a defect in appearance of the coil component may be reduced.

The reliability of coupling between the external electrode and the coil portion of the coil component may be improved.

While exemplary embodiments have been shown and described above, it will be apparent to those skilled in the art that modifications and variations could be made without departing from the scope of the present disclosure as defined by the appended claims.

What is claimed is:

1. A coil component comprising:
a body;
a coil portion including first and second lead-out terminals and disposed in the body;
an insulating film disposed between the coil portion and the body and containing a thermosetting resin having a vinyl group, the insulating film having a glass transition temperature ($T_g$) higher than 100° C.; and
an external electrode portion disposed on the body and connected to each of the first and second lead-out terminals of the coil portion.

2. The coil component of claim 1, wherein the insulating film has a thickness of 1 μm or more and 10 μm or less.

3. The coil component of claim 2, wherein the thermosetting resin includes at least one selected from the group consisting of 2,4,6,8-tetramethyl-2,4,6,8-tetravinylcyclotetrasiloxane (V4D4), 1,3,5-trimethyl-1,3,5-trivinylcyclotrisiloxane (V3D3), 1,3-diethenyl-1,1,3,3-tetramethyl-disiloxane (V2D2), 4-vinylpyridine (4VP), divinylbenzene (DVB), diethyleneglycol divinylether (DEGDVE), ethylene glycol diacrylate (EGDA), ethylene glycol dimethacrylate (EGDMA), glycidyl methacrylate (GMA), ethylene, styrene, and methyl methacrylate (MMA).

4. The coil component of claim 1, wherein the body has one surface, and one end surface and the other end surface each connected to the one surface and opposing each other, and
the external electrode portion includes first and second external electrodes disposed on the one surface of the body while being spaced apart from each other and connected to the first and second lead-out terminals, respectively.

5. The coil component of claim 4, wherein the first external electrode is disposed on the one surface of the body and is in contact with the first lead-out terminal extending from the one surface of the body, and
the second external electrode is disposed on the one surface of the body so as to be spaced apart from the first external electrode and is in contact with the second lead-out terminal extending from the one surface of the body.

6. The coil component of claim 5, further comprising an insulating substrate disposed in the body, wherein the coil portion further includes first and second coil patterns disposed on one surface and the other surface of the insulating substrate opposing each other, respectively, the first lead-out terminal is connected to the first coil pattern, and the second lead-out terminal is connected to the second coil pattern.

7. The coil component of claim 6, wherein a height of the first coil pattern is smaller than a height of the first lead-out terminal.

8. The coil component of claim 6, wherein the coil portion further includes a first sub-lead-out terminal disposed on the other surface of the insulating substrate so as to be spaced apart from the second coil pattern, extending from the one surface of the body, and connected to the first external electrode, and a second sub-lead-out terminal disposed on the one surface of the insulating substrate so as to be spaced apart from the first coil pattern, extending from the one surface of the body, and connected to the second external electrode.

9. The coil component of claim 8, wherein the coil portion further includes a first connection via penetrating through the insulating substrate and connecting the first lead-out terminal and the first sub-lead-out terminal to each other, and a second connection via penetrating through the insulating substrate and connecting the second lead-out terminal and the second sub-lead-out terminal to each other.

10. The coil component of claim 4, wherein the first lead-out terminal extends from the one end surface of the body, and the second lead-out terminal extends from the other end surface of the body.

11. The coil component of claim 10, wherein the first external electrode includes a first connection portion that is disposed on the one end surface of the body and is in contact with the first lead-out terminal extending from the one end surface of the body, and a first pad portion disposed on the one surface of the body and connected to the first connection portion, and the second external electrode includes a second connection portion that is disposed on the other end surface of the body and is in contact with the second lead-out terminal extending from the other end surface of the body, and a second pad portion disposed on the one surface of the body so as to be spaced apart from the first pad portion and connected to the second connection portion.

12. The coil component of claim 1, further comprising an insulating substrate disposed in the body, wherein the insulating film contacts at least a portion of a surface of the insulating substrate facing toward an inside of the body.

13. The coil component of claim 1, wherein the thermosetting resin includes 2,4,6,8-tetramethyl-2,4,6,8-tetravinylcyclotetrasiloxane (V4D4).

14. The coil component of claim 1, wherein the thermosetting resin includes 1,3,5-trimethyl-1,3,5-trivinylcyclotrisiloxane (V3D3).

15. The coil component of claim 1, wherein the thermosetting resin includes 1,3-diethenyl-1,1,3,3-tetramethyl-disiloxane (V2D2).

16. The coil component of claim 1, wherein the thermosetting resin includes 4-vinylpyridine (4VP).

17. The coil component of claim 1, wherein the thermosetting resin includes divinylbenzene (DVB).

18. The coil component of claim 1, wherein the thermosetting resin includes diethyleneglycol divinylether (DEGDVE).

19. The coil component of claim 1, wherein the thermosetting resin includes at least one of ethylene and styrene.

* * * * *